(No Model.) 2 Sheets—Sheet 1.
J. LA DOW.
BALING PRESS.
No. 373,076. Patented Nov. 15, 1887.
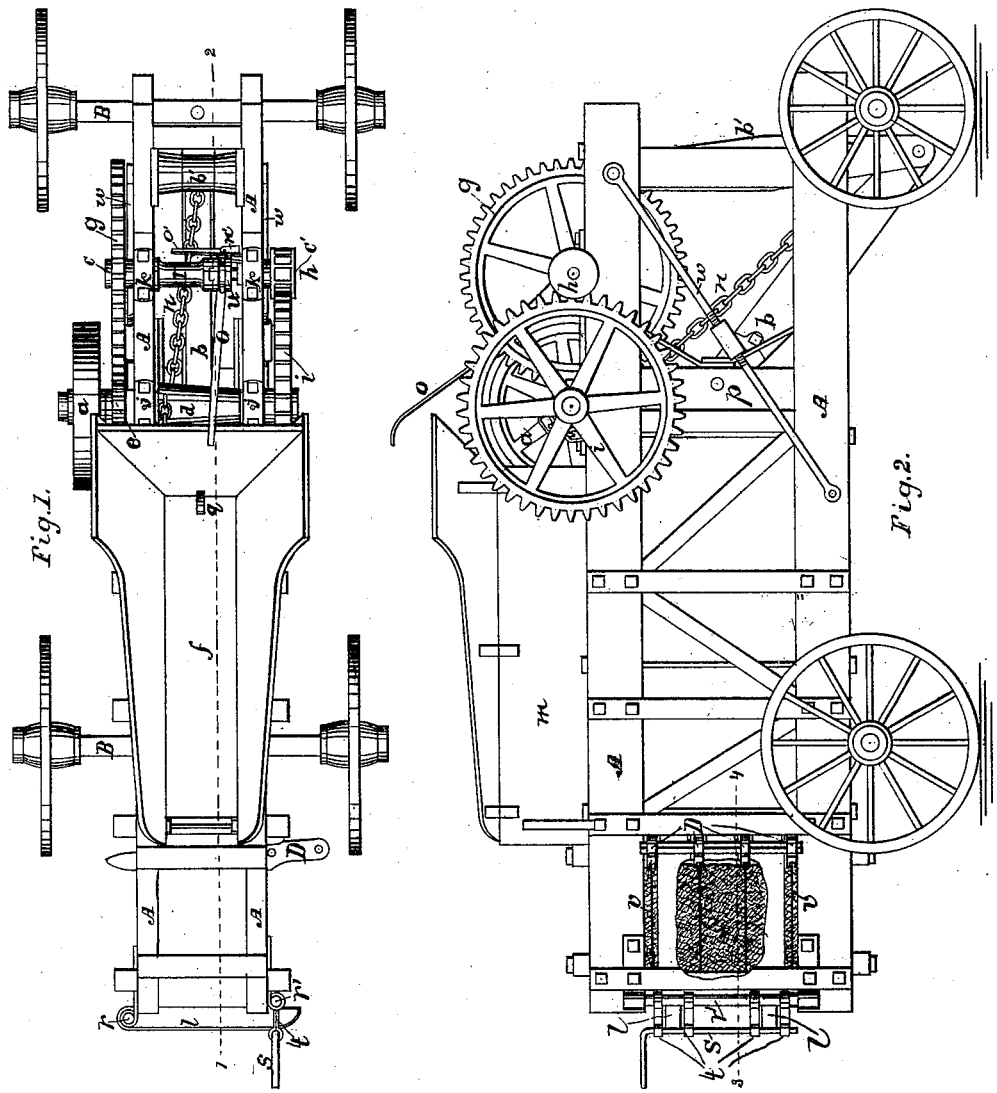
Witnesses:
F. P. Barnard,
R. H. Stewart.
Inventor:
John La Dow.

(No Model.) 2 Sheets—Sheet 2.
J. LA DOW.
BALING PRESS.
No. 373,076. Patented Nov. 15, 1887.
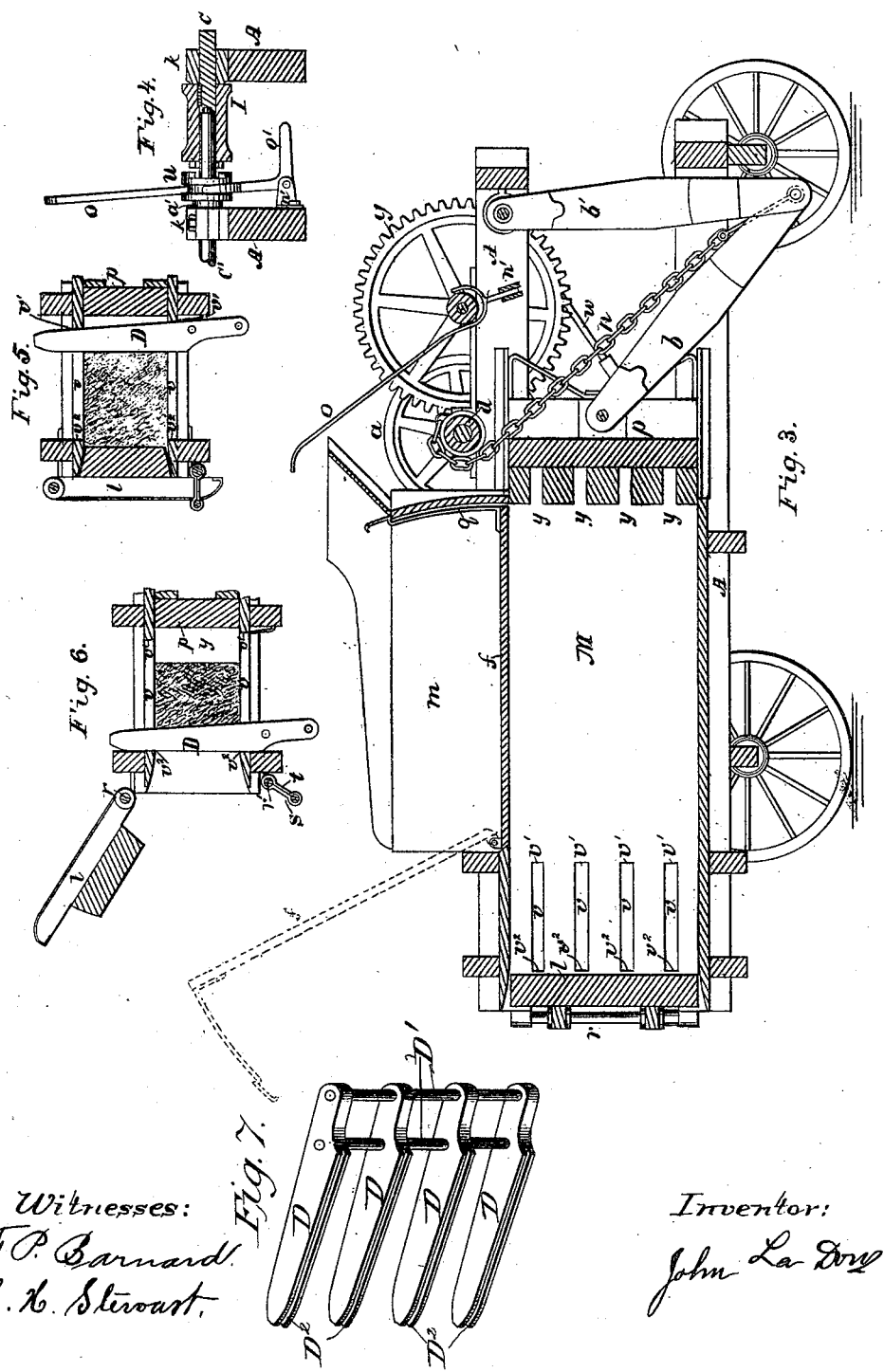

UNITED STATES PATENT OFFICE.

JOHN LA DOW, OF TRUMANSBURG, NEW YORK, ASSIGNOR TO GREGG & CO., OF SAME PLACE.

BALING-PRESS.

SPECIFICATION forming part of Letters Patent No. 373,076, dated November 15, 1887.

Application filed September 10, 1885. Serial No. 176,713. (No model.)

*To all whom it may concern:*

Be it known that I, JOHN LA DOW, a citizen of the United States, residing at Trumansburg, in the county of Tompkins and State of New York, have invented a new and useful Baling-Press, of which the following is a specification.

The objects of my present invention are to provide an improved mechanism for automatically disengaging the motive power and allowing the follower to make its return stroke; to provide an improved means for retaining the bale when freed from the follower, thus allowing the bale to be tied while the compression-chamber is being refilled; and to provide two removable firm bases against which the partially and wholly formed bales are alternately compressed. I attain these objects by the mechanism illustrated in the accompanying drawings, in which—

Figure 1 is a top view of the entire machine. Fig. 2 is an elevation of the same, with a part of the wall of the baling-chamber broken away, showing a part of the completed bale within. Fig. 3 is a longitudinal vertical section on the line 1 2 of Fig. 1, also showing the shifting bell-crank lever, which is in front of the section-plane. Fig. 4 is an enlarged detail view of the releasing mechanism, partly in section. Figs. 5 and 6 are longitudinal horizontal sections of a part of the baling-chamber on the line 3 4 of Fig. 2, respectively, showing the bale wholly and partially made. Fig. 7 is a perspective view of the retaining-strips.

Similar letters refer to similar parts throughout the several views.

The frame-work of my press consists of four heavy longitudinal beams, A, similarly placed on the two sides of the press, and suitably connected by ties, struts, and cross-beams. To the inner sides of this frame-work the sides of the baling-chamber M are attached, thus forming a rectangular inclosure for receiving the loose material, and in which the same is compressed. The top of the larger portion of this chamber—that portion intended to receive the loose material—is inclosed by door $f$, hinged at one end to the sides of the hopper $m$, and provided at the other end with a handle, $q$, which is formed into a catch adapted to hook over the end of the hopper, and thus support the door when closed. The hopper may be considered as a vertical extension to that part of the baling-chamber inclosed by the door $f$. The top of this hopper is formed by flaring or funnel-shaped sides. The objects of this construction are to facilitate the work of feeding the loose material into the press-chamber, and by closing the door $f$ confine the same while being compressed.

A strong door, $l$, adapted to open and close the end of the baling-chamber, is hung to bolt $r$, which is securely attached to beams A on one side of the press. For locking the door, bar $r'$, which is securely attached to beams A on the other side of the press, has hinged to it, by straps $t$, the bolt $s$, which is bent at right angles at its upper end so as to form a handle. When the door $l$ is closed, the bolt $s$ is adapted to be swung about bar $r'$ until it passes behind the cross-bars of the door, thus securely locking it, as shown in Figs. 1 and 2. The straps $t$ are attached to bolt $s$, close to the cross-bars of the door on either side, so as to relieve bolt $s$ of unnecessary strain.

The follower $p$, which is adapted to reciprocate within the compression-chamber, is provided with a number of deep horizontal grooves, $y$, extending across its face. Retaining-strips D, equal in number to grooves $y$, narrow toward their free ends, and are suitably connected and held the same distance apart as said grooves by two bars, D', extending through and securely attached to them near one end. Each strip has a longitudinal groove, $D^2$, along the same edge. The vertical sides of the baling-chamber are provided with longitudinal slots $v$, in the same horizontal planes as grooves $y$, and extending nearly or quite from the plane of the inner face of door $l$, when closed, to and beyond the plane of the face of the follower $p$ when at the end of its forward stroke, a distance equal to or a little greater than the widths of the retaining-strips where they pass through the respective sides of the baling-chamber, the slots thus being shorter on one side of the press than on the other to compensate for the difference in the widths of the two ends of the retaining-strips. When the retaining-strips are pushed through the slots $v$ and grooves $y$, so as to occupy the position shown in Fig. 5, they are restrained from moving backward or away from door *l* by resting against stops *v'*, which in the present case consist of that part of the frame-work forming the ends of slots *v* at the sides of the follower. In this position the retaining-strips, by thus being restrained, prevent the bale's expansion when freed from the follower, and while the bale is being tied and the compression-chamber is being refilled with loose material. When the bale is forced from the baling-chamber, the retaining-strips are free to move to the other ends of the slots, or until they occupy the position shown in Fig. 6, when they are restrained from further movement in this direction by coming in contact with stops *v²*, which consist of that part of the frame forming the ends of slots *v*, adjacent to door *l*. In this latter position the retaining-strips form an intermediate removable base between the face of the follower when at the end of its forward stroke and the face of door *l* when closed, against which the partially-formed bale is compressed. While forming this latter function the retaining-strips can be insured against breakage by closing and locking the door *l*, whose inner face will then form a central support to the retaining-strips.

The follower *p* is actuated by the toggle-joint *b b'*, one arm of which is hung to the follower and the other to the upper corner of the frame. When the press is in operation, this peculiar way of hanging the toggle causes stresses that tend to distort the frame-work, to resist which the diagonal ties *w*, together with other ties and struts, connect the upper and lower beams A A.

The toggle-joint may be operated by chain *n* or other flexible connection, one end of which is connected to the pin of the toggle's knuckle-joint, the other to the drum *d*, which is rigidly attached to its shaft mounted in bearings *j* on the upper beams, A. Drum *d* is of the form of a truncated cone, the chain *n* being connected to the larger end, thus increasing the leverage as the chain is wound on the drum toward the smaller end. The ends of the drum-shaft project beyond the frame, affording on one end a bearing, on which the initial driving-wheel *a* and pinion *e*, which are rigidly attached to each other, or made of one piece, are so hung as to turn freely, and on the other end the gear-wheel *i* is rigidly attached. Gear-wheel *i* and pinion *e* respectively mesh into pinion *h* and gear-wheel *g*, which are rigidly attached to the ends of counter-shaft *c c'*. As a result of this combination of gearing, the desired velocity-ratio between the initial driving-wheel *a* and drum *d* is obtained.

The mechanism by which the press is thrown into and out of operation is of a peculiar construction, as follows: As shown in Fig. 4, the counter-shaft consists of two parts, *c* and *c'*, whose ends bear closely together. The sleeve I, which fits onto the adjoining ends of both parts, is rigidly attached to the part *c* and provides a long bearing for the end of the part *c'*, thus allowing the two parts to turn independently of each other and at the same time retain their axes in the same straight line. This sleeve-bearing may be lengthened by a circular concentric tongue on the part *c'*, fitting into a corresponding recess in the part *c*. On the part of the shaft *c'*, which can turn freely in sleeve I, is a second sleeve, *u*, which is free to move longitudinally on the shaft, but is restrained from turning on the same by a feather or spline in the usual manner. The adjacent ends of the sleeves I and *u* are provided with claws which are adapted to engage with each other and transmit the motion of one part of the shaft to the other and operate the press. A clutch is thus formed which can readily be thrown into and out of operation by the axial movement of sleeve *u*.

The two parts of the shaft are restrained from separating by the sleeve I and collar *a'*, fitting closely to the adjacent bearings.

The axial movement of sleeve *u*, by which the clutch is thrown into and out of operation, is imparted to it by the bifurcated bell-crank lever *o*, which is pivoted to the bracket *n'*, which is securely bolted to one of the upper beams, A. The forks of the lever *o* are provided with inwardly-projecting lugs which extend into the circumferential groove in sleeve *u*. One of these forks extends upward and slightly over the hopper *m*, and provides a handle by which the operator can conveniently throw the clutch into and out of operation. When the clutch is thrown into gear, the lower arm, *o'*, of lever *o*, which is bent at an angle to the upper arm, extends into or across that part of the path of toggle-arm *b'* which said arm occupies when the follower has nearly reached the forward end of its stroke.

The advantages of this construction are, first, it allows the lever *o* to be pivoted in a position conveniently operated both by the toggle-arm and by the operator; second, by disengaging the mechanism at this point the follower can make its return-stroke without reversing any of the gearing between this point and the initial driving-wheel.

The process of making the bales and the method of retaining the same while being tied will be fully explained with the operation of the press, which is as follows: The door *f* being opened, the door *l* closed, and the follower *p* in the position shown in Fig. 3, the loose material is thrown into the hopper *m*, and by its weight and the assistance of the operator is transferred to the baling-chamber below. The tapering retaining strips D are pushed through the slots *v* with the grooved edges toward the door *l*. The door *f* is now closed, and the operator, who conveniently stands on it to hold it down, throws the clutch in operation by the lever *o*. The power required to operate the press, being applied to the driving-wheel *a*, is transmitted through the intermediate gearing and the now coupled shaft *c c'* to the drum *d*, causing it to revolve and wind up the chain *n*, thus drawing up the toggle-arms, which force the follower along the baling-chamber and thus compress the charge against the retaining-strips D, which rest against the frame at the ends of the slots $v$, as shown in Fig. 6. When the follower has nearly reached the end of its forward stroke, the arm $b'$ impinges against arm $o'$ of lever $o$, and thus imparts to this lever a motion that throws the clutch I $u$ out of operation. The drum $d$ now being free, the weight of the toggle-arms causes them to drop and return the follower to its normal position. (Shown in Fig. 3.) The retaining-strips are now withdrawn, and through the spaces they occupied the tying-wires are passed, a new charge is put into the baling-chamber, and the clutch thrown into operation, as before. This charge is first compressed against the immediately-preceding charge, Then as the pressure against the latter becomes sufficiently great it is forced along the baling-chamber until it hits the locked door $l$, which prevents its further movement, and against which the balance of the compression, which is the greater part, is effected. When the follower has sufficiently nearly completed its forward stroke, the retaining-strips D are again passed through the slots $v$ and transverse grooves $y$ in the face of the follower, as shown in Figs. 2 and 5. Now, as the clutch is automatically thrown out of operation and the follower recedes as before, the completely-formed bale is prevented from expanding by the retaining-strips D, which rest against the frame at the end of the slots $v$.

While the baling-chamber is being refilled the tying-wires may be passed through the grooves in the retaining-strips and tied, thus permanently securing the bale in form. The door $l$ is now opened, and as the next charge is compressed the completed bale is forced along the baling-chamber and expelled from its mouth, which is enlarged, as shown in the drawings, to facilitate the dropping of the bale, immediately after which the door is closed and locked. Coincident with the expulsion of the bale the retaining-strips are forced to the ends of slots $v$, adjacent to door $l$, where they are retained and afford a base for the first section of the new bale to be compressed against, as before.

It will be observed that the main functions of the retaining-strips are, first, to retain the completed bale against expanding when released by the follower, thus enabling the press-chamber to be refilled while the bale is being tied; second, to afford a base against which the first section of the bale is compressed to the required density at the first stroke of the follower.

While I deem the hereinbefore-described process of making a bale best adapted to bales made of two charges only, the process can be extended by compressing two or more charges against the retaining-strips, then two or more against the door, with the previous charges intervening.

What I claim as my invention is—

1. In a baling-press, the combination, with the train of gearing consisting of gear $i$, rigidly attached to the drum-shaft, pinion $h$ and gear $g$, rigidly attached to the remote ends of two-part shaft $c$ $c'$, and loose pinion $e$, suitably hung and adapted to mesh into gear $g$, of drum $d$, two-part shaft $c$ $c'$, and clutch I $u$, whereby said two-part shaft can be coupled and uncoupled, substantially as described.

2. In a baling-press, the combination, with a baling-chamber, a follower, toggle-arms for reciprocating the same, and means for actuating the toggle-arms, of bell-crank lever $o$ $o'$, which is pivotally hung to the press-frame, and one of whose arms, $o'$, extends into the path of one of the toggle-arms, while its other arm, $o$, is adapted to shift sleeve $u$, substantially as described.

3. In a baling-press, the shafts $c$ $c'$, forming the central elements of the mechanism for transmitting the power from the initial driving-wheel to drum $d$, in combination with sleeve I, rigidly attached to one of said shafts and providing a bearing for the other, and sleeve $u$, which is restrained from all but an axial movement on the shaft that can turn freely in sleeve I, both of said sleeves having their adjacent faces provided with claws, whereby the sleeves are adapted to engage with each other, substantially as described.

4. In a baling-press, the combination, with a baling-chamber having slots in two of its opposite sides, and a follower adapted to reciprocate within the same, of two firm bases against which are alternately compressed the partially and wholly formed bales, said bases consisting one of a door hinged at one side of the baling-chamber and adapted to open and close the mouth of said chamber, and provided with suitable mechanism for locking the door when closed, the other of retaining-strips D, suitably connected and extending through said slots and across the baling-chamber, combined with stops provided at the sides of the baling-chamber, and against which said retaining-strips rest while forming an intermediate base between said door when closed and the follower when at the end of its forward stroke, substantially as described.

5. In a baling-press, the combination of a baling-chamber having slots or apertures in two of its opposite sides, a follower having deep grooves extending across its face, retaining-strips adapted to be inserted through said slots and grooves, stops located at opposite sides of the follower when at the end of its forward stroke, against which the retaining-strips rest, and by which said strips are prevented from receding before the pressure of the compressed bale when the latter is relieved from the pressure of the follower, substantially as described.

6. In a baling press, the combination of a baling-chamber, a follower having deep grooves extending across its face, a door hung at the end of the baling-chamber and adapted to open and close the mouth of the same, two sets of stops, which, being located, the one set at either side of the follower when at the end of its forward stroke, the other in or near the plane of the face of said door when closed, a series of slots in opposite sides of the baling-chamber extending between the respective stops of each set, and retaining-strips suitably connected together near one end and adapted to extend through said slots and across the baling chamber and act, first, to prevent the immediate expansion of the bale when freed from the follower by resting against one set of said stops; and, secondly, to provide a removable intermediate base between the face of said door when closed and the face of the follower when at the end of its forward stroke, and against which the partially-formed bale is compressed, substantially as described.

7. In a baling-press, the combination of a baling-chamber provided with slots $v$, a follower having deep grooves $y$ extending across its face, stops $v'\,v^2$, and retaining-strips D, suitably connected together, said strips being tapered toward their free ends, whereby they are more easily thrust through and withdrawn from the baling-chamber, substantially as described.

8. In a baling-press, the combination, with a baling-chamber and follower adapted to reciprocate within the same, of two firm but removable bases, against which the partially and wholly formed bales are alternately compressed, one of said bases being located between the other and the face of the follower when at the end of its forward stroke, substantially as described.

In testimony whereof I have hereunto subscribed my name.

JOHN LA DOW.

Witnesses:
F. P. BARNARD,
R. H. STEWART.